United States Patent [19]

Denker et al.

[11] Patent Number: 4,470,922
[45] Date of Patent: Sep. 11, 1984

[54] PHOSPHATE NEODYMIUM GLASS FOR LASER USE

[76] Inventors: Boris I. Denker, ulitsa Ordzhonikidze, 14. kv. 117; Alexandr Y. Karasik, Chistoprudny bulvar, 15. kv. 5; Galina V. Maximova, ulitsa Shvernika, 3, korpus 1, kv. 65; Alexandr A. Maljutin, Zeleny prospect, 34, kv. 19; Vyacheslav V. Osiko, ulitsa Vavilova, 48, kv. 63; Pavel P. Pashinin, ulitsa Vavilova, 4, korpus 3, kv. 92; Alexandr M. Prokhorov, Zvenigorodskaya ulitsa, 14, korpus A. kv 10; Ivan A. Scherbakov, Leninsky prospect, 39/1, kv. 297, all of Moscow, U.S.S.R.

[21] Appl. No.: 527,206

[22] Filed: Aug. 30, 1983

Related U.S. Application Data

[63] Continuation of Ser. No. 441,389, Nov. 12, 1982, abandoned, which is a continuation of Ser. No. 214,990, Dec. 10, 1980, abandoned, which is a continuation of Ser. No. 45,386, Jun. 4, 1979, abandoned.

[51] Int. Cl.$^3$ .................. C03C 3/16; C09K 11/42; C09K 11/46
[52] U.S. Cl. .............. 252/301.4 P; 501/45; 501/48
[58] Field of Search ............... 501/45, 48; 252/301.4 P

[56] References Cited

U.S. PATENT DOCUMENTS

| | | | |
|---|---|---|---|
| 4,022,707 | 5/1977 | Deutschbein et al. | 501/48 |
| 4,075,120 | 2/1978 | Myers | 252/301.4 P |
| 4,076,541 | 2/1978 | Rapp | 501/48 |

FOREIGN PATENT DOCUMENTS

| | | | |
|---|---|---|---|
| 2304582 | 10/1976 | France | |
| 51-59911 | 5/1976 | Japan | 252/301.4 P |

Primary Examiner—M. L. Bell
Attorney, Agent, or Firm—Fleit, Jacobson, Cohn & Price

[57] ABSTRACT

Phosphate neodymium glass for laser use, consisting of phosphoric anhydride, an oxide of at least one of alkaline metals, and neodymium oxide or a mixture of neodymium oxide and oxide of at least one of the following metals; La, Gd, Lu, Sc, Y, Al, Cr; the ratio between the above-cited components as follows (mol. %):

| | |
|---|---|
| phosphoric anhydride | 64–77 |
| oxide of at least one of alkaline metals | 26–8 |
| neodymium oxide or a mixture of neodymium oxide with an oxide of at least one of the metals: Ln, Gd, Lu, Sc, Y, Al, Cr. | 10–15 |

The herein-proposed invention is intended for producing active elements for lasers of a wide purpose including thin-film and miniature lasers with generation wavelengths within the ranges 1.06 and 1.34μ. Phosphate neodymium glass for laser use of the developed composition can be synthesized in required amounts by a simple method. Application of this glass for making active elements of lasers leads to increasing the efficiency of pumping and specific power output.

4 Claims, 1 Drawing Figure

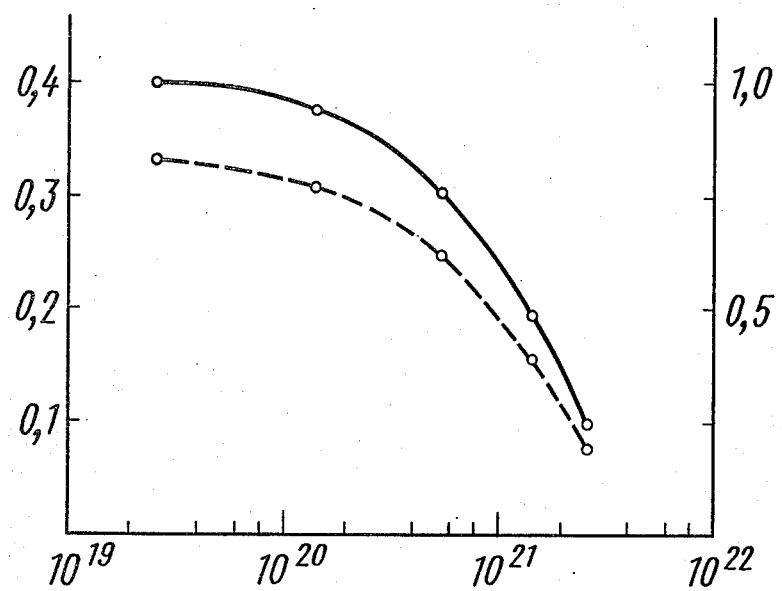

PHOSPHATE NEODYMIUM GLASS FOR LASER USE

This application is a continuation of application Ser. No. 441,389, filed Nov. 12, 1982, now abandoned, which in turn is a continuation of application Ser. No. 214,990, filed Dec. 10, 1980, now abandoned, which in turn is a continuation of Ser. No. 45,386, filed June 4, 1979, now abandoned.

FIELD OF APPLICATION

The present invention relates to laser materials and more particularly to phosphate neodymium glasses for laser use, said glasses being intended for producing active elements of wide-purpose lasers including thin-film and miniature lasers with generation wavelengths within the ranges 1.06 and 1.34$\mu$.

BACKGROUND OF THE INVENTION

Known in the art are crystals and glasses of different compositions containing trivalent neodymium as active ions.

One of known compositions of phosphate glass for laser use is the composition of the following components in mol. %:

| | |
|---|---|
| phosphoric anhydride | 55–70 |
| aluminium oxide | 1–15 |
| neodymium oxide | 0.5–5 |
| oxide of at least one of alkaline metals | 10–25 |
| oxide of at least one of the metals: La, Ba, Ca, Sr, Mg | 5–15 |
| (French Patent No. 2,304,582). | |

The above-cited composition is disadvantageous in that the concentration of active neodymium ions is limited to 0.01–5 mol %.

An increase in $Nd^{3+}$ concentration leads to strong concentration quenching of $Nd^{3+}$ luminescence and degradation of adsorbed energy to thermal vibrations, which deteriorates considerably the output characteristics of lasers. The limitation of concentration of $Nd^{3+}$ ions does not allow the required optical densities to be attained in small volumes which, in its turn, restricts the degree of miniaturization of lasers.

It is an object of the Invention to eliminate the above-cited disadvantages.

BRIEF DESCRIPTION OF THE INVENTION

The object of the present invention is to provide phosphate neodymium glass for laser use which can contain a great amount of $Nd^{3+}$ under the condition that concentration quenching of the luminescence is much weaker than in most known laser matrices.

Said object is accomplished by that phosphate neodymium glass is proposed which contains phosphoric anhydride, an oxide of at least one of alkaline metals, neodymium oxide or a mixture of neodymium oxide of at least one of the metals: La, Gd, Lu, Sc, Y, Al, Cr; according to the invention, said components being taken in the following ratio (mol.%):

| | |
|---|---|
| phosphoric anhydride | 64–77 |
| oxide of at least one of the alkaline metals | 26–8 |
| neodymium oxide or a mixture of neodymium oxide with an oxide of at least one of the metals: La, Gd, Lu, Sc, Y, Al, Cr | 10–15. |

DETAILED DESCRIPTION OF THE INVENTION

The herein-proposed invention is accomplished in the following way.

A mixture of 64–77 mol.% of phosphorus anhydride, 26–8 mol.% of carbonate of at least one of alkaline metals, 10–15 mol.% of neodymium oxide or a mixture of neodymium oxide with an oxide of at least one of the metals La, Gd, Lu, Sc, Y, Al or Cr is poured into a corundum crucible. The obtained mixture is stirred carefully and placed into a cold resistance furnace where the mixture is heated up to 1200° C. for 5–6 hours. Then the mixture is kept in the furnace at this temperature for 2 hours, after which the crucible is withdrawn from the furnace and the melt of the mixture is poured out from the crucible into a quartz boat. The obtained glass-like ingot is ground and placed into a cylindrical platinum crucible. The platinum crucible is placed into the chamber of an induction furnace with dry atmosphere. Phosphate neodymium glass for laser use resides in the induction furnace chamber at 1200° C. for 20 hours. Then the crucible with the melt is taken out from the furnace and the melt is poured into a graphite mould. The phosphate neodymium glass for laser use is cooled in the mould down to 450° C. and is charged into the resistance furnace heated to 450° C. for crude roasting. Crude roasting is performed at 450° C. for several hours. Upon completion of the roasting process the temperature is decreased to 28° C.

The phosphate neodymium glass for laser use of the following composition (in mol. %) is obtained:

| | |
|---|---|
| phosphoric anhydride | 64–77 |
| oxide of at least one of alkaline metals | 26–8 |
| neodymium oxide or a mixture of neodymium oxide with an oxide of at least one of the metals: La, Gd, Lu, Sc, —Y, Al, Cr | 10–15. |

The phosphate neodymium glass obtained is characterized by the following properties:
the number of particles of $Nd^{3+}$(N)—up to $(2-4)\cdot 10^{21}$ cm$^{-3}$; lifetime of an excited metastable state of $4F_{3/2}Nd^{3+}(\tau)$—80–50 $\mu$s;
the peak values of the absorption coefficients in the absorption bands of $Nd^{3+}$(K) for wavelengths 0.74, 0.8, and 0.87$\mu$: $K_1$ up to 50 cm$^{-1}$, $K_2$ up to 65 cm$^{-1}$, and $K_3$ up to 20 cm$^{-1}$, respectively;
the cross-section of the generation transition $$^4F_{3/2} \rightarrow {}^4I_{11/2}(\sigma) - 3.7 \times 10^{-20}\text{--}3.9 \times 10^{-20} \text{ cm}^2:$$

the peak absorption coefficient in the absorption band of water ($K_{OH}$) for the wavelength 3.45$\mu$—no more than 3 cm$^{-1}$.

To obtain phosphate neodymium glasses for laser use with different $Nd^{3+}$ concentration, some portion of neodymium oxide can be replaced by an oxide of at least one of the following metals: La, Gd, Lu, Sc, Y, or Al.

The attached drawing presents the plot of the concentration dependence of the luminescense quantum yield and lifetime of the excited state of for the phosphate neodymium glasses for laser use of the following composition: $Li_2O$ (26 mol.%)—[($Lu_2O_3$)$_{1-x}$+($Nd_2O_3$)$_x$] (10 mol.%)—$P_2O_5$ (64 mol.%), $0.01 \leq x < 1$ (x varies from 0.01 to 1; when x=0.01 the number of $Nd^{3+}$ particles is $2.7 \times 10^{19}$ cm$^{-3}$).

The $Nd^{3+}$ concentration expressed in number of particles per cm$^3$ is given on the abscissa axis in a logarithmic scale; the left ordinate axis gives the values of lifetime of an excited state of $$^4F_{3/2}Nd^{3+}$$

in μs and the ring ordinate axis—the values of the quantum luminescence yield on the level $$^4F_{3/2}Nd^{3+}.$$

The continuous line is plotted for the luminescence quantum yield on the level $$^4F_{3/2} Nd^{3+};$$

the dotted line for the lieftime values of an excited state of $$^4F_{3/2}Nd^{3+}.$$

As is seen from the plot, a change of the $Nd^{3+}$ concentration in the phosphate neodymium glass from $2.7 \times 10^{19}$ to $2.7 \times 10^{21}$ cm$^{-3}$ changes the values of lifetime of an excited state of $$^4F_{3/2}Nd^{3+}$$

from 340 to 80 μs which points to a weak concentration luminescence quenching in the proposed phosphate neodymium glass for lasers.

Chromium oxide is introduced into phosphate neodymium glass for sensitization of neodymium luminescence. Chromium oxide is introduced into the initial charge in amounts 0.1-5.0 mol.%. The general content of oxides $Nd_2O_3 + Cr_2O_3$ or $Nd_2O_3 + Me_2O_3 + + Cr_2O_3$, where Me is at least one of the metals La, Gd, Lu, Sc, Y, Al, or Cr, must be within the range 10-15 mol.%.

The proposed invention makes possible the change of $Nd^{3+}$ concentration in a wide range from $2.7 \times 10^{19}$ to $(2-4) \times 10^{21}$ cm$^{-3}$, the luminescence quantum yield on the laser level of $$^4F_{3/2}Nd^{3+}$$

remaining high at $Nd^{3+}$ concentration more than $10^{21}$ cm$^3$, and allows the introduction of an impurity which sensitizes neodymium luminescence. The glass for laser use of the proposed composition can be synthesized by a simple method in required ampunts; application of this glass for making active elements of lasers leads to increasing the efficiency of pumping and specific power output.

For a better understanding of the present invention the following examples of realizing thereof are given hereinbelow by way of illustration.

Example 1

A mixture of 807 g $Nd_2O$, 441 g $Li_2CO_3$, and 2130 g $P_2O_5$ is charged into a corundum crucible. The mixture is carefully stirred and placed into a cold resistance furnace. The mixture in the resistance furnace is heated up to 1200° C. for 5-6 hours and kept at this temperature for 2 hours. Then the crucible with the melt form is withdrawn from the furnace by a holding device and the melt is poured out into a quartz boat. The glass-like ingot obtained is ground and put into a cylindrical platinum crucible with a capacity size of 1 l. The crucible is placed into a chamber of an induction furnace with dry atmosphere. Phosphate neodymium glass resides at 1200° C. in dry atmosphere for 20 hours. Upon completion of the process the crucible with the melt of the phosphate neodymium glass is taken out from the furnace and the melt is poured out into a graphite mould. The phosphate neodymium glass for laser use is cooled down to 450° C. and then is placed for crude roasting into a resistance furnace heated to 450° C. Crude roasting is performed for several hours at 450° C. after which the temperature is lowered to 25° C. The phosphate neodymium glass thus obtained has the following composition in mol.%: $Li_2O(26)$—$Nd_2O_3(10)$—$P_2O_5(64)$, and is characterized by the following properties: the number of $Nd^{3+}$(N) particles—$2.7 \times 10^{21}$ cm$^{-3}$; the lifetime of the metastable state of $$^4F_{3/2}Nd^3 (\tau) - 80 \; \mu s;$$

the peak values of the absorption coefficients in $Nd^{3+}$ absorption bands for wavelengths 0.74, 0.80, and 0.87 μm; $K_1 = 40$ cm$^{-1}$, $K_2 = 55$ cm$^{-1}$, $K_3 = 14$ cm$^{-1}$, respectively; the cross-section of the generation transition $$^4F_{3/2} \rightarrow {}^4I_{11/2} = 3.8 \times 10^{-20} \, cm^2;$$

the peak absorption coefficient $K_{OH}$ of the water absorption band for the wavelength $\eta = 3.45$ μm does not exceed 3 cm$^{-1}$. Generation with a wavelength 1.055 μm has been obtained in a semiconfocal resonator at room temperature for the sample of such glass. The curvature radius of a spherical mirror was 6 cm and the mirror reflection coefficients R were 99.5%. A glass sample 1.6 mm thick is placed at a distance of 2 cm from the plane mirror. The longitudinal pumping is performed by Roman benzene laser at wavelengths 0.745 and 805 μm. The pumping radiation was focused through a plane mirror by a lens having a focal distance f = 25 cm. The diameter of the region being pumped in this configuration is 700 μm whereas the diameter of the main mode in the sample is 130 μm. The measured value of the threshold of pumping energy absorbed by the sample was 5 mjoule which corresponds to 170 mkjoule as calculated for the volume of the mode being generated.

Example 2

A mixture consisting of 76.6 g $Li_2CO_3$, 545.5 g $K_2CO_3$, 209.6 g $Nd_2O_3$, 376.2 g $Gd_2O_3$, 63.2 g $Cr_2O_3$, and 1947.7 g of $P_2O_5$ is put into a 5 l corundum crucible. The subsequent operations are performed by following the procedure described in Example 1. The phosphate neodymium glass for lasers is obtained which consists of the following components in mol.%: [$Li_2O(5) +$ $K_2O(19)]—(Nd_2O_3(3)+Gd_2O_3(5)+Cr_2O_3(2)]—P_2O_5(66)$, and is characterized by the properties:

$N=7.5 \cdot 10^{20}$ cm$^{-1}$,
$\tau=220$ μs
$K_1=11$ cm$^{-1}$,
$K_2=16$ cm$^{-1}$,
$K_3=5$ cm$^{-1}$,
$\sigma=3.9 \cdot 10^{-20}$ cm$^2$,
$K_{OH}<3$ cm$^{-1}$, the peak values of the absorption coefficients in the absorption bands of $Cr^{3+}$ for the wavelengths 0.46 and 0.66μ: $K_{Cr1}=52$ cm$^{-1}$, $K_{Cr}=54$ cm$^{-1}$.

Example 3

A mixture of 143.4 g $Li_2CO_3$, 224.3 $Rb_2CO_3$, 719.6 $Nd_2O_3$, 53.4 g $ScO_3$, and 1987.4 $P_2O_5$ is put into a 5 l corundum crucible. The subsequent operations are performed by following the procedure described in Example 1. The phosphate neodymium glass for lasers is obtained which consists of the following components in mol.%; $[Li_2O(10)+Rb_2O(5)]—[Nd_2O_3(11)+ScO_3(2)]—P_2O_5(72)$ and is characterized by the properties:

$N=2.9 \cdot 10^{21}$ cm$^{-3}$,
$\tau=80$ μs
$K_1=43$ cm$^{-1}$,
$K_2=59$ cm$^{-1}$,
$K_3=17$ cm$^{-1}$,
$\sigma=3.85 \cdot 10^{-20}$ cm$^2$,
$K_{OH}<3$ cm$^{-1}$

Example 4

A mixture of 203.5 g $Li_cCO_3$, 641,8 $Cs_2CO_3$, 463.9 $Nd_2O_3$, 80.2 g $Al_2O_3$, and 1813.3 g $P_2O_5$ is placed into a 5 l corundum crucible. The subsequent operations are performed by following the procedure described in Example 1. The obtained phosphate neodymium glass for lasers consists of the following components in mol.%: $[Li_2O_3(14)+Cs_2O(10)—[Nd_2O_3(7)+Al_2O_3(4)]—P_2O_5(65)$, and is characterized by the properties:

$N=1.75 \ 19^{21}$ cm$^{-3}$,
$\tau=120$ mks,
$K_1=29$ cm$^{-1}$,
$K_2=38$ cm$^{-1}$,
$K_3=11$ cm$^{-1}$,
$\sigma=3.8 \cdot 10^{-20}$ cm$^2$,
$KOH<3$ cm$^{-1}$.

Example 5

A mixture of 241.6 g $Li_2CO_3$, 115.6 g $Na_2CO_3$, 90.3 g $K_2CO_3$, 440 g $Nd_2O_3$, 173.5 g $Lu_2O_3$, 98.4 g $Y_2O$, 15.2 g $B_2O_3$, and 2045 g $P_2O_5$ is placed into a 5 l corundum crucible. The subsequent operations are performed as described in Example 1. The obtained phosphate neodymium glass for lasers consists of the following components in mol.%;

$[Li_2O(15)+Na_2O(5)+K_2O(3)]—[Nd_2O_3(6)+Lu_2O_3(2)+Y_2O_3(2)+B_2O_3(1)]—P_2O_5(66)$, and is characterized by the properties:

$N=1.5 \cdot 10^{21}$ cm$^{-3}$,
$\tau=130$ mks,
$K_1=23$ cm$^{-1}$,
$K_2=34$ cm$^{-1}$,
$K_3=8$ cm$^{-1}$
$\sigma=3.9 \cdot 10^{-20}$ cm$^2$,
$K_{OH}<3$ cm$^{-1}$.

Example 6

A mixture of 152.2 g $Li_2CO_3$, 218.6 g $Na_2CO_3$, 416.4 g $Nd_2O_3$, 402.9 g $La_2O_3$, and 1991.3 g $P_2O_5$ is charged into a 5 l corundum crucible.

The obtained phosphate neodymium glass for lasers consists of the following components in mol.%: $[Li_2O(10)++Na_2O(10)]—Nd_2O_3(6)+La_2O_3(6)—P_2O_5(68)$, and is characterized by the properties:

$N=1.5 \cdot 10^{21}$ cm$^{-3}$
$\tau=140$ mks,
$K_1=25$ cm$^{-1}$,
$K_2=34$ cm$^{-1}$,
$K_3=9$ cm$^{-1}$,
$\sigma=3.8 \cdot 10^{-20}$ cm$^2$,
$K_{OH}<3$ cm$^{-1}$.

Example 7

A mixture of 437.6 g $Li_2CO_3$, 520 g $La_2O_3$, 230 g $Nd_2O_3$, and 2072.8 g $P_2O_5$ is put into a 5 l corundum crucible. The subsequent operations are performed as described in Example 1. The obtained phosphate glass for lasers consists of the following components in mol.%: $Li_2O(26)—[La_2O_3(7)—Nd_2O_3(3)]—P_2O_5(64)$, and is characterized by the properties:

$N=8 \cdot 10^{20}$ cm$^{-3}$,
$\tau=180$ mks,
$K_1=12$ cm$^{-1}$,
$K_2=16$ cm$^{-1}$,
$K_3=4$ cm$^{-1}$,
$\sigma=3.85 \cdot 10^{-20}$ cm$^2$,
$K_{OH}<3$ cm$^{-1}$.

A laser active element 5×50 mm was prepared from the obtained glass and used for generation testing in the regime of free generation at various frequencies of pulse repetition. The tests were performed in a cylindrical quarz reflector 30 mm in diameter and 45 mm long with a silvered side surface. The lamp and active element were cooled by a solution of $K_2CrO_4$ in distilled water. The capacity of accumulator as 50 mkF; duration of pumping pulse was 60 mks. The outer plane dielectric mirrors were used with the reflection coefficients $R_1=100\%$ and $R_2=85\%$. Generation with a wavelength of 1.055 mkm was obtained for the active element under study: the threshold pumping power was 1.5 joule, and dynamic efficiency 2%. An average value of the output power obtained in the described experimental scheme was 10 W at an average pumping power 600 wt.

A laser active element 4×25 mm was also prepared from the glass obtained. On this element generation was obtained at room temperature with a wavelength of 1.32 mkm in a confocal (r=600 mk) optical resonator created by the outer spherical mirrors with a multilayer dielectric coating whose penetration was about 1% at a generation wavelength. The generation threshold power was 20 joule.

Example 8

A mixture of 587.8 g $Na_2CO_3$, 717.7 g $Nd_2O_3$, and 1938, 4 g $P_2O_5$ is put into a 5 l corundum crucible. The subsequent operations are performed as described in Example 1. The obtained phosphate neodymium glass for laser use consists of the following components (mol.%): $Na_2O(26)—Nd_2O_3(10)—P_2O_5(64)$, and is characterized by the properties:

$N=2.5 \cdot 10^{21}$ cm$^{-3}$,
$\tau=90$ μs, $K_1 = 39$ cm$^{-1}$,
$K_2 = 53$ cm$^{-1}$,
$K_3 = 13$ cm$^{-1}$,
$\sigma = 3.65 \cdot 10^{-20}$ cm,
$K_{oH} < 3$ cm$^{-1}$.

What is claimed is:

1. Phosphate neodymium glass for laser use, consisting of phosphoric anhydride, an oxide of at least one alkali metal, and neodymium oxide with the following relation of the components in mol.%:

| | |
|---|---|
| phosphoric anhydride | 64–77 |
| oxide of at least one alkali metal | 8–26 |
| neodymium oxide | 10–15. |

2. Phosphate neodymium glass for laser use, consisting of phosphoric anhydride, an oxide of at least one alkali metal, lanthanum oxide, and neodymium oxide with the following relation of the components in mol.%:

| | |
|---|---|
| phosphoric anhydride | 64–77 |
| oxide of at least one alkali metal | 8–26 |
| neodymium oxide | 10–15 | wherein the total amount of neodymium oxide and lanthanum oxide is not more than 15 mol.%.

3. Phosphate neodymium glass for laser use, consisting of phosphoric anhydride, an oxide of at least one alkali metal, lanthanum oxide, chromium oxide and neodymium oxide with the following relation of the components in mol.%:

| | |
|---|---|
| phosphoric anhydride | 64–77 |
| oxide of at least one alkali metal | 8–26 |
| neodymium oxide | 10–15 |
| chromium oxide | up to 5 | wherein the total amount of neodymium oxide, lanthanum oxide and chromium oxide is not more than 15 mol.%.

4. Phosphate neodymium glass for laser use, consisting of phosphoric anhydride, an oxide of at least one alkali metal, lanthanum oxide, chromium oxide, an oxide of at least one of metals Gd, Lu, Sc, Y, and Al, and neodymium oxide with the following relation of the components in mol.%:

| | |
|---|---|
| phosphoric anhydride | 64–77 |
| oxide of at least one alkali metal | 8–26 |
| neodymium oxide | 10–15 |
| chromium oxide | up to 5 | wherein the total amount of neodymium oxide, lanthanum oxide, chromium oxide and oxide of at least one of metals Gd, Lu, Sc, Y and Al is not more than 15 mol.%.

* * * * *